United States Patent
James et al.

(10) Patent No.: US 6,231,828 B1
(45) Date of Patent: May 15, 2001

(54) PROCESS FOR PRODUCING SODIUM PERCARBONATE

(75) Inventors: Alun P. James, Liverpool; Graham R. Horne, Warrington, both of (GB); Richard Roesler, Kraainem (BE); Lido Signorini; Robert Owen, both of Brussels (BE); Soraya Parvaneh, Livorno (IT); Romano Pardini, I-Rosignano-Solvay (IT); Stefano Bigini, I-Terni (IT); Manfred Mathes; Uwe Droste, both of Bad Hoenningen (DE); Pier-Luigi Deli, Ne/Genova (IT)

(73) Assignee: Solvay Interox SA, Brussels (BE)

( * ) Notice: Subject to any disclaimer, the term of this patent is extended or adjusted under 35 U.S.C. 154(b) by 0 days.

(21) Appl. No.: 09/142,940
(22) PCT Filed: Mar. 27, 1997
(86) PCT No.: PCT/EP97/01562
§ 371 Date: Dec. 23, 1998
§ 102(e) Date: Dec. 23, 1998
(87) PCT Pub. No.: WO97/35806
PCT Pub. Date: Oct. 2, 1997

(30) Foreign Application Priority Data

Mar. 26, 1997 (IT) .............................. MI97A0711

(51) Int. Cl.$^7$ .................................................. C01B 15/10
(52) U.S. Cl. ............................................... 423/415.2
(58) Field of Search ........................................ 423/415.2

(56) References Cited

U.S. PATENT DOCUMENTS 2,986,448 * 5/1961 Gates et al. .
3,870,783 * 3/1975 Hall et al. .
3,979,318 * 9/1976 Tokiwa et al. .
4,022,874 * 5/1977 Mollard et al. .
4,075,116 * 2/1978 Mesaros .
4,117,097 * 9/1978 Klebe et al. .
5,294,427 * 3/1994 Sasaki et al. .
5,690,701 * 11/1997 Bigini et al. .
5,906,660 * 5/1999 Pardini et al. .

FOREIGN PATENT DOCUMENTS 0 703 190 * 3/1996 (EP) .
0 748 764 * 12/1996 (EP) .
1469352 * 4/1977 (GB) .

* cited by examiner

Primary Examiner—Steven P. Griffin
Assistant Examiner—Christina Ildebrando
(74) Attorney, Agent, or Firm—Larson & Taylor, PLC

(57) ABSTRACT

Sodium percarbonate is traditionally made in a crystallization process from aqueous hydrogen peroxide and sodium carbonate with recycle of mother liquor in the presence of a substantial concentration of a salting-out agent, conventionally sodium chloride. The invention provides a process intended to be conducted without addition of chloride salting-out agent in which the dissolution step (1) is controlled to restrict the sodium carbonate concentration to below 95%; preferably 60 to 90% of its saturated concentration at a temperature preferably controlled to at most 35° C. and the mole ratio of hydrogen peroxide: sodium carbonate in the reaction vessel is controlled to between 0.7 to 1.2:1, and preferably about 1:1. In some embodiments at least a fraction of the mother liquor introduced into the dissolution tank (1) is obtained by extraction from the reaction vessel (6) and in other embodiments a fraction of the sodium percarbonate (2) is introduced in solution in the mother liquor (4) and a fraction is introduced in particulate form (8) directly into the reaction vessel (6). Large particle sodium percarbonate is provided which has a 7 day aged heat emission at 40° C. of not more than 3 $\mu$W/g measured in a microcalorimeter over 16 hours that is lower than the heat emission from conventionally produced sodium percarbonate employing a chloride salting-out agent.

30 Claims, 2 Drawing Sheets

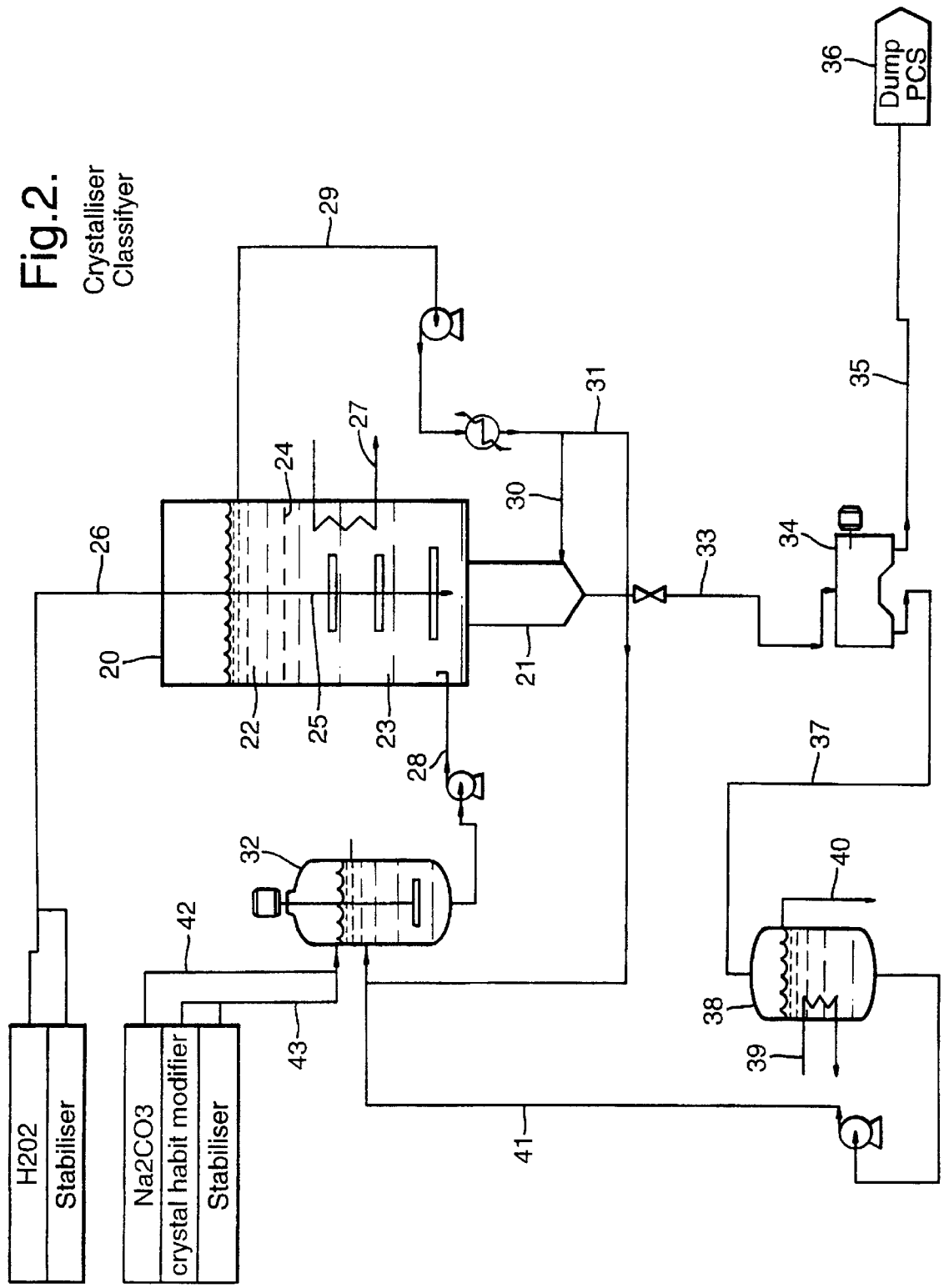

PROCESS FOR PRODUCING SODIUM PERCARBONATE

Figure 1:
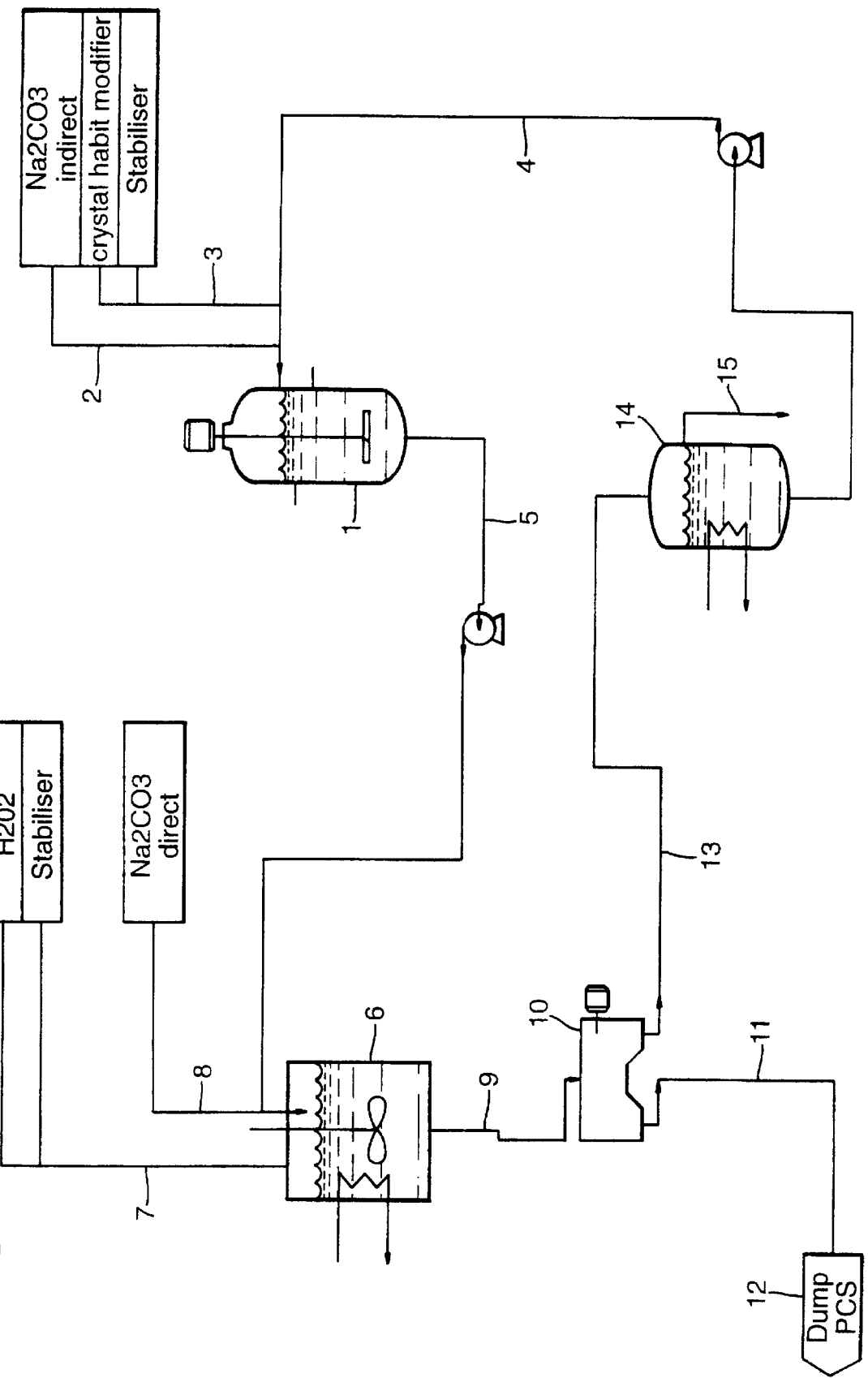

This invention relates to a process for producing a persalt and more particularly to the production of sodium percarbonate and sodium percarbonate so produced. It also relates to sodium percarbonate itself, and to compositions containing it.

Sodium percarbonate as used herein is the name commonly employed in industry for sodium carbonate peroxyhydrate having the formula $Na_2CO_3.1.5H_2O_2$ and is often referred to as PCS. Although PCS has a wide range of uses employing its oxidant and disinfectant qualities, its currently most widespread use is as a bleach in washing compositions and especially the compact and super-compact compositions that have been promoted by the detergent industry since the 1980s, or in dish washing compositions or as a bleach additive or in hard-surface cleansing compositions.

Sodium percarbonate can be produced by a variety of process routes, normally employing a reaction between hydrogen peroxide and a source of sodium and carbonate. In some variations, often called collectively as "wet processes", the process comprises forming an aqueous solution of sodium carbonate, mixing it with an aqueous solution of hydrogen peroxide under reaction conditions including the concentrations of the sodium carbonate and hydrogen peroxide and temperature selected such that sodium percarbonate (PCS) crystallises out of solution. The solid PCS product is then separated from the solution, often by filtration or centrifugation, is possibly subjected to further surface treatments or granulation, and dried. The separated solution, which is usually referred to as mother liquor, is discarded, forms the basis for a surface treatment or is recycled. Although a wet process could be carried out in a batch-wise fashion, it is usually carried out continuously.

In order to recover a greater fraction of product from the solution in a wet process, the practice has been commonly adopted for many years of conducting the reaction in the presence of an otherwise unreactive sodium salt such as specifically sodium chloride or adding the salt to promote further crystallisation before the solid PCS is separated. This practice, typically referred to as "salting out", also drives the reaction further towards completion, converting a higher fraction of the reactants into the desired product and as a further consequence enables greater production to be obtained from a reactor of a given size. The mother liquor after separation from solid PCS contains residual concentrations of sodium and carbonate ions and hydrogen peroxide, and it will be recognised that these concentrations would be lowered as a result of the presence or introduction of the salting-out agent.

Like any process that it is desired to operate commercially, it is desirable, in principle, to minimise reagent losses, for example by recycling at least a fraction of the mother liquor to dissolve further sodium carbonate in a make-up tank before transfer into the reaction vessel. This has the additional advantage of avoiding or minimising the proportion of mother liquor which is discharged into the environment. With increasingly stringent controls being introduced in many countries on what can legally be discharged into water courses or the aquifer, the cost has increased of pre-treatment of alkaline waste liquors like mother liquors before discharge. However, there are inherent practical difficulties associated with recycling mother liquor. In particular, because it contains residual hydrogen peroxide, there is risk that on introduction of sodium carbonate into the make-up tank, further crystallisation of sodium percarbonate will be induced, producing a dispersion of solid fines that subsequently act as seeds in the reactor, so that the resultant product has less desired properties. In particular, a product which thereby contains a high proportion of small particles is rendered significantly less desirable for incorporation in compact and super-compact washing compositions. Ausimont spa in EP-A-748764 has drawn attention to the problem of premature crystallisation and solves the problem by treating the mother liquor before it is recycled to the soda ash dissolution vessel to deliberately decompose hydrogen peroxide. However, such a solution inevitably impairs process economics by increasing the waste of an important reactant.

Even if the hydrogen peroxide is not decomposed as a deliberate action in the mother liquor, there is a potential for its decomposition during the step of dissolution of sodium carbonate into recycled mother liquor, particularly where conditions are chosen to promote the rate and extent of dissolution, such as the elevated temperatures commonly employed in current continuous processes that employ sodium chloride as salting-out agent. The extent of loss of hydrogen peroxide under otherwise identical conditions in the dissolution tank is naturally related to its concentration in the mother liquor and consequently the problem would be exacerbated if little or no salting out agent is employed in the crystalliser, for the reasons identified above.

The use of a salting-out agent remains common practice in wet processes, in view of the significant advantages identified above. However, its presence in the precipitated PCS reduces the content of hydrogen peroxide which is available for release from the solid. Additionally and importantly, it has been suggested that the most effective salting out agent and the one which has been employed commercially, sodium chloride, can adversely affect the stability of PCS, but there is contrary teaching on this point. For example, Kemira in WO 9405594 has suggested that the presence of sodium chloride actually improves the stability of PCS.

Although, in theory, a wet process can be operated without addition of a salting-out agent, the absence of the salting out agent results in a lower conversion of reagents to PCS and a lower recovery of PCS from the liquor, so that the recycled mother liquor contains a higher concentration of hydrogen peroxide, thereby increasing the likelihood of premature crystallisation on recycle as well as the extent of hydrogen peroxide losses during recycle.

Expressed most starkly, the problem facing a persalt manufacturer who might wish to use a wet process to make PCS is that the wet process in common practice employs a salting out agent for effective operation of the process, whereas the product obtained has potentially less desirable properties.

It is an object of certain aspects of the present invention to provide a wet process for producing sodium percarbonate which ameliorates or overcomes one or more of the problems or disadvantages of operating without the benefit of the presence of a substantial concentration of salting-out agent.

It is a second object of further aspects of the present invention to provide a wet process for producing sodium percarbonate having properties rendering it particularly suitable for incorporation in washing compositions.

According to one aspect of the present invention there is provided a continuous process for the manufacture of sodium percarbonate in which hydrogen peroxide, sodium carbonate and an aqueous medium are introduced into a reaction vessel in which the hydrogen peroxide and sodium carbonate react with the formation of sodium percarbonate which precipitates out of solution, the precipitated sodium percarbonate is separated from the mother liquor and recovered as product and at least a fraction of the mother liquor is recycled to the reaction vessel characterised in that in step a) particulate sodium carbonate and recycled mother liquor are fed continuously into a dissolution tank maintained within a temperature range of from 15 to 50 C, the relative feed rates and temperature being controlled such that the concentration of sodium carbonate in solution does not exceed 95% of a saturated solution;

in step b) sodium carbonate solution is continuously withdrawn from the dissolution tank;

in step c) sodium carbonate solution withdrawn from the dissolution tank in step b), additionally or alternatively particulate sodium carbonate and concentrated hydrogen peroxide solution are continuously introduced into an agitated reaction vessel containing an aqueous suspension of sodium percarbonate particles in mother liquor to maintain a mole ratio calculated at $H_2O_2$ and $Na_2CO_3$ within the range of more than 0.7:1 and less than 1.3:1 maintaining a temperature within the range of from 10 to 25 C, thereby continuously forming and precipitating sodium percarbonate.

Such a continuous process for producing sodium percarbonate can be operated without the addition of a salting out agent.

One important feature of the process comprises the restriction of the concentration of sodium carbonate in the dissolution tank to an upper limit of 95% of a saturated solution, and preferably to not more than about 90% of the saturated solution. In many processes, sufficient solid soda ash is introduced into the dissolution tank to increase its concentration to at least 60% of the saturated concentration and in many embodiments desirably at least 70%. The appropriate rate of introduction of sodium carbonate relative to the flow rate of mother liquor can be determined readily, by first determining the concentration of sodium carbonate that constitutes a saturated solution at the selected temperature, measuring its concentration in recycled mother liquor, and by comparison calculating the amount necessary to increase its concentration to within the desired or preferred range. The restriction in the maximum concentration of soda ask introduces as a beneficial consequence a control to prevent undue decomposition of hydrogen peroxide in the mother liquor.

The residence time of the mother liquor in the dissolution tank is controlled so as to attain the desired concentration of soda ash therein. The residence time is often chosen in the range of up to 60 minutes and in some preferred embodiments from 5 to 40 minutes.

A second important feature of the process relates to the control of temperature of the mother liquor in the dissolution tank. The temperature is controlled in association with the feed rates to ensure that the 95% saturation concentration of carbonate is not exceeded. However, it is advantageous that by controlling its temperature to below 35 C and in preferred embodiments to below 30 C, it is possible to retard the rate of hydrogen peroxide decomposition significantly by comparison with the conventionally operated dissolution tanks which employ a temperature in the range of 40 C to 55 C. In many instances, the dissolution is operated at a temperature of over 15 C and often between 20 and 30 C. It will be recognised that the dissolution of soda ash is exothermic, so that it is necessary to cool the mother liquor to prevent the desired temperature being exceeded. Conventional cooling means can be employed such as a cooling jacket or cooling coils. Agitation/mixing of the mixture in the dissolution tank is carried out in practice to enable fresh mixture to contact the cooling surfaces and to reduce the risk of localised excess soda ash concentrations occurring.

By controlling the extent of soda ash introduction to a maximum that is significantly below saturation whilst at the same time maintaining a comparatively low temperature in the dissolution tank, it is possible to achieve a significant increase in the weight of soda ash dissolved in the mother liquor, whilst minimising the risk that fine particulates would remain in suspension or be precipitated from the solution during the dissolution activity, which fines would have the effect of impairing eventual PCS product quality. Consequently, the combination allows the benefit of reducing hydrogen peroxide wastage without creating a significant risk of impairing product quality.

In addition to controlling the temperature of the mother liquor in the dissolution tank, it is beneficial to control it after its separation from precipitated PCS until it is pumped into the dissolution tank so that it is not permitted to exceed 35 C and preferably not exceed 30 C, for example by insulating pipework and any intervening holding tank. As a further variation, the mother liquor may be pre-cooled, for example in the transfer pipes or in the holding tank, for example to a temperature of at least 5 C lower than the desired temperature in the dissolution tank, and in some instances between 5 and 20 C. By so doing, a lower cooling capacity can be employed in the dissolution tank.

A further important feature of the process comprises the control of the relative rates of hydrogen peroxide and recycled mother liquor into the crystalliser in order to maintain a sub-stoichiometric concentration of hydrogen peroxide relative that in the eventually precipitated PCS, but one that is neither too low not too high. The use of a mole ratio of below 0.7:1 would increase the risk of in situ precipitation of fine particles of sodium carbonate decahydrate. On the other hand, as the mole ratio of peroxide to soda ash increases, the concentration of PCS in a saturated solution also increases, so that at an excessive mole ratio, an insufficient fraction of the PCS precipitates out recycling a higher concentration of peroxide and increasing the risk of reagent losses during recycling. The selection of a mole ratio of between 0.7 and 1.3:1, and preferably between 0.8 and 1.2:1, particularly around 1:1 balances the objectives of reducing the risk of decahydrate precipitation, maintaining plant capacity and controlling reagent losses on recycling. It will be recognised that the peroxide concentration in the recycled mother liquor produced in a process employing the selected substoichiometric mole ratio of peroxide:soda ash in the crystalliser can be tolerated by virtue of the control of the temperature in the dissolution tank and the controlled extent of soda ash dissolution, so that the various features cooperate together to create a working process. The concentrations of sodium carbonate and hydrogen peroxide in the reaction vessel are desirably monitored, either continuously or at regular intervals.

The crystalliser is usually operated at a temperature selected in the range of from 10 to 25 C and preferably from 15 to 20 C. In practice, the operating temperature in the reaction vessel is than the dissolution tank temperature. To achieve the necessary cooling, the vessel is often provided with a cooling jacket and/or cooling coils to obtain and maintain the selected temperature.

The reaction vessel is provided usually with agitation means to maintain the sodium percarbonate particles suspended. Such means can include mechanical agitation or means for pumping the suspension or mother liquor through a submerged pump or via an external loop.

The process can also include a second agitated reaction or buffer vessel interposed between the reaction vessel and the filter/centrifuge. If desired this can be cooled to operate at a lower temperature than in the primary reaction vessel, such between 3 and 8 C lower. The lower temperature can induce further precipitation of sodium percarbonate, thereby enhancing product recovery and reducing the concentration of peroxide in the mother liquor on recycle.

The invention process introduces concentrated hydrogen peroxide as reactant. Desirably, its concentration is at least 30% w/w and is advantageously at least 35 w/w. In practice, its concentration is often not greater than 80% w/w and in many instances not greater than 70% w/w. Excellent results have been obtained employing a concentration in the range of 35 to 60% w/w. The hydrogen peroxide will itself often contain one or more stabilisers for acidic conditions intended to preserve it during transportation or storage prior to its use. Such stabilisers typically include a phosphate such as pyrophosphate, often at a concentration of from 25 to 500 ppm based on the peroxide concentrate, and/or a tin compound which has been introduced as a stannate, but can adopt a colloidal oxy-tin form in situ, often in the range of 10 to 100 ppm based on the peroxide concentrate. The concentrate can optionally contain a polyphosphonate as identified further below, often in a concentration of up to 1000 ppm. The presence of such stabilisers can be taken into account in determining how much additional stabiliser for peroxide or percarbonate is introduced otherwise into the process cycle.

The invention process in this aspect also contemplates the introduction of particulate sodium carbonate into the reaction vessel in some embodiments. The total amount of sodium carbonate introduced in the reaction vessel in solution from the dissolution tank and introduced directly is chosen to provide the mole ratio of sodium carbonate to hydrogen peroxide in the reaction vessel within the ranges described hereinbefore. The choice of the relative proportion of the two modes of introduction remains within the discretion of the process user, ranging from 100% introduction via the dissolution tank to 100% direct introduction. It is beneficial that at least a fraction of the sodium carbonate is introduced via direct introduction, such as at least 10% and in many embodiments from 20 to 60%. By employing direct introduction for at least a fraction, it is possible to compensate wholly or partly for the loss of plant capacity that would otherwise arise from avoiding the use of the common practice salting-out agent. In practice, therefore, the choice of a two mode introduction of soda ash, or substantially all via direct introduction can represent an excellent operating method.

The term direct introduction can be satisfied by feeding the solid material as such into the reaction vessel, or alternatively and preferably by introducing the solids into a stream of liquor fed into the vessel. The liquor can comprise liquor withdrawn from the dissolution tank or possibly liquor withdrawn from the reaction vessel and recycled back to it. In either instance, the point of introduction of the solid material is usually such that little if any of the solid sodium carbonate has dissolved before introduction of the liquor suspension into the tank, but rapid dissolution occurs within the reaction vessel itself.

The soda ash which can be employed can comprise either light or heavy soda ash or a natural material such as trona.

The invention process is often operated at the subsisting alkaline pH achieved by the introduction of sodium carbonate and concentrated hydrogen peroxide to maintain a mole ratio within the ranges specified hereinabove. It remains at the discretion of the operator to vary the pH in the reaction vessel, for example by introduction of soda solution, such as within the range of pH 10 to pH 11, or to compensate if the feed should include a fraction of sodium bicarbonate.

It is highly desirable for the mother liquor and/or liquor containing added carbonate withdrawn from the dissolution tank to contain at least one stabiliser for alkaline hydrogen peroxide so as to reduce or minimise its decomposition, and especially in cooperation with the features identified above for controlling decomposition during the production of the PCS product and recycle of the mother liquor. Such stabilisers are often selected from inorganic or complexing stabilisers or from a mixture of both. It will be recognised that stabilisers in the process cycle are usually present in the mother liquor at a higher concentration relative to hydrogen peroxide than in the concentrate.

Alkali and soluble alkaline earth metal silicates represent convenient inorganic stabilisers which co-precipitate in the PCS product and continue to offer stabilisation therein. The silicate is often a sodium, potassium or magnesium silicate or a mixture thereof. The silicate is often represented by the formula $Na_2O:nSiO_2$ (or corresponding formulae for other metals) in which n is selected in the range of from 0.5 to 4, such as in ortho or metasilicate. It is convenient to express the amount of silicate employed relative to the weight of soda ash employed, the weight often being selected in the range of from 5 to 80 g/kg soda ash.

Complexing agents for metals, and especially for transition metals represent valuable stabilisers in the invention process. Such complexing agents are often selected from polycarboxylate or polyphosphonate salts, either introduced as such or in acid form, including polyaminocarboxylates such as EDTA or DTPA, polyaminomethylenephosphonates such as EDTMPA, CDTMPA and DTPMPA and hydroalkylenephosphonates such as hydroxyethylidenediphosphonate. A convenient amount of such complexing stabilisers to employ is often selected in the range of from 0.5 to 20 g/kg soda ash and particularly from 1 to 5 g/kg.

The point or points of introduction of the stabiliser are at the discretion of the process operator. The stabiliser or stabilisers can be introduced into the crystalliser, either directly or by prior introduction into one or both of the reactant solutions. For example, the silicate can be added together with the soda ash into the dissolution tank and the complexing agent introduced into the peroxide concentrate holding tank. Alternatively, at least a fraction of the complexing agent can also be introduced into the soda ash dissolution tank or into the recycle liquor after its separation from the product and to prior to its infeed into the dissolution tank. The PCS product tends to remove with it a fraction of the complexing stabiliser, so that by restoring its concentration shortly after separation, the loss of peroxide can be further reduced.

It is often advantageous to carry out the production and precipitation of PCS in the presence of a crystal habit modifier, sometimes alternatively referred to as a crystallisation aid. Such modifiers or aids tend to modify the growth of the PCS crystals, encouraging the formation of regular abrasion-resistant needle-shaped crystals and rounded particles. The use of such modifiers can also increase the bulk density of the PCS product, as can complexing stabilisers. The modifiers are often selected from alkali metal (such as sodium) or ammonium phosphates, including hexametaphosphate, pyrophosphate and non-stoichiometric condensed phosphates. Alternative or additional modifiers can comprise homo or co-polymers of acrylate and/or methacrylate, fumarate or maleate and the corresponding acids. The co-polymers include co-polymers of (meth) acrylate/acid with acrylamide and/or alkylene oxides such as ethylene oxide and/or propylene oxide, and can be random or block copolymers.

It is often convenient to employ one of more modifiers to a total weight of from 0.5 to 50 g/kg soda ash, and particularly from 1 to 20 g/kg. In some embodiments both a phosphate and a polyacrylate modifier are used, their weight ratio often being selected in the range of from 1:1 to 10:1. In other embodiments, only one type of crystal habit modifier is used, such as the organic polymer, ie the polyacrylate or mixture of polyacrylates. It will also be recognised that compounds such as organic phosphonates can contribute to crystal habit modification, even if they are nominally introduced as peroxide stabilisers.

In practice, it is highly desirable for the flow rates of materials into and withdrawn from the dissolution tank and the reaction vessel to be balanced, thereby maintaining a substantially steady state, with a constant rate of production of the PCS and substantially constant volumes within the tank and vessel. This can readily be achieved by monitoring the flow of PCS suspension from the vessel and the flows of mother liquor around the cycle and/or the volumes in the tank and vessel and adjusting the pump speeds to control the flow rates accordingly. It can be assisted by including a buffer tank in the mother liquor cycle.

By balancing the respective flow rates of reagents into the vessel and product withdrawn from it, a substantially constant environment can be maintained within the reaction vessel, such as solids density, and concentrations of reagents in the liquor and hence, product characteristics. It is desirable to maintain the concentration of soda ash within the liquor in the reaction vessel at a concentration within the range of 100 to 160 g/kg and preferably within the range of 130 to 150 g/kg. It is similarly desirable to maintain the concentration of hydrogen peroxide in the liquor in the reaction vessel in the range of 25 to 65 g/kg and preferably 35 to 60 g/kg. In practice, the concentrations of soda ash and peroxide in the vessel will also be constrained by the temperature that is maintained in the vessel and the control of the mole ratio of peroxide:carbonate to within the mole ratio range described hereinabove.

At start-up, if mother liquor from a salt-free process is not available, the sodium carbonate can be dissolved to the appropriate concentration in water, which may if desired have been purified or deionised, the hydrogen peroxide introduced into the reaction vessel at a suitable rate to achieve the desired mole ratio (through a higher amount since the residue in recycled liquor is absent) and operation of the process will result in the conditions progressing to the steady state.

The mother liquor introduced into the dissolution tank in step a) can be provided solely by liquor separated from the PCS suspension withdrawn from the reaction vessel.

In a variation of or modification to the foregoing process, and in an additional step h), mother liquor is withdrawn continuously from and returned to the reaction vessel, at least a fraction being recycled via a dissolution tank in step a). The mother liquor is most preferably withdrawn from a non-agitated zone within the crystalliser where particulates can settle, often separated from the agitated zone by a mesh through which mother liquor can pass. The mother liquor recycled in step h) can augment or replace the mother liquor separated from the PCS product in step f). The remaining fraction of mother liquor obtained in steps f) and h) can be recycled directly into the reaction vessel, preferably to the extent that maintains a steady volume. By employing mother liquor extracted directly from the vessel to augment, or even instead of liquor recovered from the suspension, it is possible to recycle the liquor through the dissolution tank at a greater rate than can be provided solely by the liquor recovered from the suspension in step f). This means that it is easier to satisfy the requirement that the concentration of soda ash in the mother liquor in the dissolution tank does not exceed the desired maximum of 95% of the saturation concentration, ie provides a 5% buffer, and likewise is easier to provide the much larger buffer that is preferred. Alternatively or additionally, a fraction of the benefit can be obtained by the increased flow of mother liquor through the dissolution tank enabling a higher plant capacity to be obtained from the same size crystalliser.

Although the process according to the first aspect of the invention and/or the modification above is directed especially to a process operated without addition of a salting out agent, it will be understood that in accordance with a further modification, the process can be operated under otherwise the same operating conditions, but in the presence of sodium sulphate or similar halide-free salting out agent. In such a modification, the mother liquor can contain the halide-free salt in a concentration of often up to 125 g/kg solution, preferably at least 40 g/kg solution and particularly from 60 to 100 g/kg solution.

In accordance with a further modification of the process according to the first aspect, the crystalliser forms an integral part of a crystalliser classifier in which the crystalliser is positioned above and communicates with the classifier, and sodium percarbonate product descends through the classifier to a point of extraction and in counter direction to a stream of liquor passed through the classifier. Such a crystalliser classifier is described more fully in EP-A-0703190, to Solvay Interox SA, which description is incorporated herein by reference. Herein, the crystalliser/classifier is employed in conjunction with the above identified invention conditions for the dissolution tank, namely the controlled introduction of soda ash and its controlled temperature therein so as to minimise or at least reduce the wasteful loss of hydrogen peroxide.

When the crystalliser/classifier is employed in accordance with this modification, it will be recognised that the conditions described in EP-A-0703190 for its operation in the presence of a salting out agent such as sodium chloride are modified to make allowance for the absence of the salting-out agent. Accordingly, it is desirable to maintain the temperature conditions and selection of mole ratio of soda ash to hydrogen peroxide in the crystalliser zone of the crystalliser/classifier within the ranges described hereinabove for a plain crystalliser, but for example using the ascend rate of mother liquor upwardly through the classifier and the relative agitation extent in the crystalliser the classifier described in EP-A-0703190. It will be seen that by employing the combination of the apparatus of EP-A-0703190 in conjunction with the process conditions of the instant invention, it is possible to obtain a product which combines the benefits of both processes, namely a product that is substantially free from salting out agent and has a large tight granulometry, thereby reducing decomposition during storage and incorporation in compositions and also reduces or minimises reagent losses during manufacture.

In this modification using a classifier crystalliser, the benefit is especially attainable by operating a process free from salting out agents, but it will also be recognised that a significant fraction of those benefits can still be retained when a halide-free salting out agent such as sodium sulphate is employed as salting out agent, at the low temperature process operating conditions, the main difference being that the attainable available oxygen in the product is maybe around 0.1–0.2% lower.

According to a second aspect of the present invention, in some embodiments there is provided a process for the manufacture of sodium percarbonate in which hydrogen peroxide, sodium carbonate and an aqueous liquor are introduced into a reaction vessel in which the hydrogen peroxide and sodium carbonate react forming sodium percarbonate which precipitates out of solution, the precipitated sodium percarbonate is separated from the mother liquor and recovered as product and at least a fraction of the mother liquor is recycled to the reaction vessel characterised in that at least a fraction of the sodium carbonate introduced into the reaction vessel is dissolved in mother liquor that has been separated from the precipitated sodium percarbonate and/or otherwise withdrawn from the reaction vessel and the mother liquor containing an enhanced concentration of sodium carbonate is thereafter recycled to the reaction vessel and at least a fraction of the sodium carbonate is introduced in solid form directly into the reaction vessel or into a recycle of liquor withdrawn from and returned into the reaction vessel.

In accordance with the second aspect of the present invention there is provided apparatus for the continuous production of sodium percarbonate which comprises a reaction vessel equipped with an inlet for aqueous hydrogen peroxide and an inlet for sodium carbonate in which vessel the hydrogen peroxide reacts with the sodium carbonate to form sodium percarbonate which precipitates out of solution and provided with means for continuously withdrawing a suspension of sodium percarbonate and passing it to a solid liquid separator, and a line to recycle liquor recovered from the separator to the reaction vessel characterised in that the apparatus includes two means to introduce sodium carbonate into the reaction vessel, one means of which comprises a dissolution tank placed in the line recycling liquor from the separator to the vessel and/or placed in a recycle loop which comprises means for extracting liquor from and returning it to the vessel whereby the sodium carbonate is introduced in dissolved form into the vessel and a second means which introduces particulate sodium carbonate directly into the vessel or into a line introducing liquor into the vessel.

By providing two separate means for introducing the sodium carbonate into the process cycle, greater flexibility is provided for control of the overall process.

In accordance with this second aspect, it will be recognised that such a process in which soda ash is introduced into the process cycle in two different parts is especially well suited to a process which employs either no salting out agent or possibly only a halide-free agent such as sodium sulphate.

In the dissolution tank, the soda ash can desirably be introduced at a rate relative to the influent mother liquor selected to obtain its concentration in the tank and at a temperature in accordance with any of the desired or preferred conditions in step a) of the process according to the first aspect of the present invention. Thus, in particularly desired conditions the sodium carbonate concentration is controlled to between 75 and 90% of a saturated solution and its temperature is controlled to between 25 and 30 C. By so doing, this process also retains the benefit of preventing excessive decomposition of hydrogen peroxide during carbonate dissolution. The means for introducing soda ash into the dissolution tank can comprise the conventional means for feeding a particulate material into a tank, such as a conveyor belt, screw, chute or pipework located above the tank and feeding the material from a storage or holding hopper, possibly under the influence of gravity. Naturally, the means includes appropriate flow control means such as valves or gates to control the rate of introduction.

The means for introducing solid soda ash into the process cycle can comprise similar means described above for feeding the particulate material into the dissolution tank. Indeed, it will be recognised that a single flow from the soda ash storage hopper can be split or two separate flows can be taken. However, it can be preferable for the particulate material to be wetted before it is introduced into reaction vessel. This can be achieved by introducing the soda ash into a stream of either mother liquor shortly before it is returned into the reaction vessel. The particulate material can conveniently be introduced via a Venturi device.

The proportion of soda ash introduced in solution and the proportion introduced as a solid can be varied at the discretion of the process user, and indeed may be selected in accordance with the remaining apparatus employed and depending on the other process parameters. If a split soda ash introduction is employed in conjunction with a process operated in accordance with the first aspect, preferably containing no salting out agent, but optionally containing a sulphate, it is desirable in many instances to introduce between 35 to 95%, particularly 45 to 75% via the dissolution tank and the remainder via solid introduction.

The damp sodium percarbonate separated from the mother liquor in accordance with the above-identified processes can be subjected to post-separation treatments including drying, for example in a fluidised bed or rotating bed drier.

Advantageously, the sodium percarbonate produced herein by chloride-free processes, and especially from salt-free processes can and often does exhibit certain particularly desirable properties. In particular, sodium percarbonate is produced which exhibits a very low rate of emission of heat. A representative figure to enable a realistic comparison between products produced using different processes and in different locations can be obtained by first subjecting the percarbonate sample to a 7 day aging process in a sealed ampoule in a constant temperature chamber held at at 40 C, thereby bringing the percarbonate to substantially a plateau value for the heat emission. Such aging is indicated herein by reference to the product being 7 day aged. The product is then transferred to microcalorimeter, model LKB 2277, also called a Thermal Activity Monitor which is marketed by Thermometric Limited, Sweden. The heat is measured that is emitted from the sample over a standard period, which herein is 16 hours and at a standard test temperature which herein is 40 C. By comparison, a typical product obtained from a wet process involving chloride salting out can often emit from 5 to 7 $\mu W/g$ in the 16 hour test period, whereas the invention process products usually emit less than 3 $\mu W/g$, often at least 0.5 $\mu W/g$, and in many instances from 1 to 2 $\mu W/g$. By being able to produce a product with such a low heat emission, bulk storage and bulk transportation of the product is thereby improved-, lowering and in practice virtually eliminating the likelihood that a self-accelerating decomposition of the product would arise. Sodium percarbonate with a higher heat emission can, of course, be handled and stored safely, but often needs more stringent control and precautionary means to remove the heat evolved. The invention products having lower heat emission can enable the sodium percarbonate to be handled and stored under more adverse conditions, such as in hotter climates or with reduced investment in precautionary means to remove heat.

Additionally, the product of the instant process, normally is produced having a mean particle size of at least 500 $\mu m$, often at least 600 μm, and usually not more than 1200 μm and in many instances not more than 1000 μm, and in many preferred instances in the range of from 650 to 850 μm, such as about 750 μm. In other instances, the mean particle size produced falls within the range of 600 to 650 microns. The product usually has a particle distribution which is similar to "normal", the spread for which depends on the type of plant employed. A crystalliser often produces a product with a spread of around 1 to 1.2 whereas a crystalliser classifier often produces a product with a narrower spread, such as from about 0.6 to about 0.9. The product usually displays at least 80% and frequently at least 90% of its particles by weight within the range of ±50% of the mean particle size. The advantage of the product having a tight distribution is that it avoids the small particles which are liable to segregation and the worst rate of decomposition and the advantage of a large mean particle size is that this minimises decomposition, for example when present in a detergent composition with other current constituents. In some instances, it is desirable to produce products intrinsically comprising mainly particles that are at least 400 microns in diameter and relatively few above 800 microns in diameter.

Desirably, the chloride free invention process described herein can also produce a product which has a low rate of pick-up of moisture from a humid atmosphere. This is demonstrated by a test in which the percarbonate is stored under constant temperature and humidity conditions, such as at 32 C and 80% RH.

In practice the test is conducted using a 9 cm diameter petri dish with a 1 cm depth rim that is weighted accurately on a 4 decimal place balance, (W1). A sample of dry sodium percarbonate (about 5 g) is placed on the petri dish which is gently agitated to generate an even particulate layer across the base of the dish and reweighed on the same balance, (W2). The sample on the petri dish is stored in a room, about 3 M high, wide and long in an atmosphere maintained for a period of 24 hours at 32° C. by a thermostat controlled heater and at 80% Relative Humidity (RH) by introduction of a fine droplet water spray under the control of an humidity detector and weighed on the same balance, (W3). The samples are protected by a shield from the spray.

The invention products made without chloride salting out agent are observed to pick up less than 30 g/kg in 24 hours in the test, whereas a conventional chloride salted-out product can pick up over 100 g/kg under the same conditions. In many instances, the invention product picks up not more than 15 g/kg in the test, such as less than 15 g/1000 g and in some especially preferred instances below 10 g/kg eg 1–5 g/1000 g.. This means in practice that the products of the halide-free invention process are more stable in storage with constituents like siliceous or phosphate builders which it is believed can generate a humid atmosphere.

It is especially preferable in some embodiments in which the crystallised sodium percarbonate is intended to be incorporated in built detergent compositions, such as compositions built with zeolites and/or with phosphates to make the sodium percarbonate by a process in which a classifier is integral with the crystalliser, and operated such that particles above and below a desired minimum size are separated out in the classifier, the larger particles are recovered as product whereas the smaller particles are recycled to the crystalliser where they can grow as a result of deposition of additional sodium percarbonate from solution, typically by addition of salting-out agent into saturated or supersaturated sodium percarbonate solution in the crystalliser, and the enlarged particles flow back into the classifier. Naturally, in accordance with the teaching herein, such salting out agent is free from chloride (except perhaps at an impurity level) in order to provide the advantageous property of low moisture pick-up. Salting out agents, as is known, operate by the common ion effect, so that salting out represents advantageously the addition of additional sodium ions without adding chloride ions to the process solution containing sodium carbonate from which the percarbonate is produced. Such salting out agents can comprise sodium sulphate or like other non-chloride sodium salt in an integrated crystalliser/classifier and particularly one in which mother liquor is caused to flow upwardly through the classifier into the attached crystalliser that is positioned above. Such combined classifier/crystallisers are particularly beneficial in that by suitable operational control, it can be possible to control the granulometry of the particles during manufacture rather than having to employ an external and hence additional classification process whilst at the same time producing the sodium percarbonate with advantageous properties such as low moisture pick-up and low heat emission described herein.

Advantageously, by the use of the processes according to the present invention, and particularly those variations which omit a halide salting out agent from the process cycle, it is possible to produce products which have a high purity, for example having an Avox of at least 14.5% and in the absence of any salting out agent, a product in some embodiments which has an avox of at least 14.8%.

The presence of selected peroxide stabilisers and crystal habit modifiers in the mother liquor during the precipitation means that in general they are also co-precipitated in the product. Their presence can affect not only the habit of the crystals but also the size distribution, and it is believed that they contribute significantly to the excellent properties of the resultant product.

It has also been found that the invention process products retain the excellent rates of dissolution and high bulk density that have previously been exhibited by products that were obtained in a wet process using chloride to salt out.

According to a fourth aspect of the present invention, there is provided dry particulate sodium percarbonate characterised in that intrinsically a) it has a mean particle size of at least 500 μm up to 2000 μm and b) it has a 7 day aged heat emission in 16 hours of below 3 μW/g.

"Intrinsically" herein refers to the sodium percarbonate itself, even if it is subsequently subjected to one or more treatments such as surface coating or agglomeration.

Such a product enjoys the twin benefits of large particle size enabling it more readily to be employed for its most common use, viz incorporation in built washing compositions or built additive compositions and especially those containing siliceous and/or phosphate builders, and of low heat emission enabling it to be transported and stored in bulk at the point of manufacture or use, such as under more adverse conditions or with less heat control investment.

The fourth aspect in preferred embodiments provides sodium percarbonate which can be further characterised by one or more of the following features:

c) It is produced by crystallisation from a bulk solution containing hydrogen peroxide and sodium carbonate;

d) It is produced in a process from from chloride or preferably any salting-out agent;

e) It has a moisture pick-up over 24 hours storage at 80% relative humidity and at 32 C of not more than 30 g/kg and preferably not more than 15 g/kg;

f) It has an apparent bulk density of from 800 to 1100 g/kg, and preferably from 850 to 1000 g/kg;

g) It contains at least one phosphonate stabiliser and at least one crystal habit modifier selected from sodium silicate and a polyacrylate in a total amount of from 1 to 8 g/kg;

h) It has an Avox (available oxygen) of at least 14.5% and preferably at least 14.8%.

By producing the product from a bulk solution, it is possible to employ plant that has previously been used for making other persalts, thereby introducing flexibility into manufacture and prolonging the life of plant.

The advantage of avoiding chloride salting out agent is that it avoids the effect of chloride on the rate at which moisture can be picked=up and increases the chance of attaining a high avox.

By producing a product having intrinsically a low rate of moisture pick-up, the stability is maintained of the product in humid conditions, such as appertain in detergent and especially zeolite-built compositions.

By producing a product having a bulk density that is like that conventionally produced in a wet process involving chloride salting out, the product can be readily substituted for existing PCS.

By selecting a product which contains the selected stabiliser and/or crystal habit modifier in the range shown, the product demonstrates improved crystal habit and stability compared with when such products are absent.

By producing a product which can have a high avox, there is greater activity provided per unit weight.

In a number of embodiments, desirable percarbonate products comprise products which are obtained using a process that excludes a salting-out agent and are further defined by one or more, preferably two or more and especially three or more of features selected from a), b), and e) to h) described hereinabove.

The properties of products produced in the invention process and specified in the fourth aspect of the invention can be further enhanced by further treatments. Such treatments can include granulation and surface treatments with one or more inorganic or organic coating agents to respectively bind the PCS particles together or and/or interpose a layer between the sodium percarbonate and its environment. Such a granulation process often involves contacting the PCS particles with an aqueous solution of a binder under low agitation conditions which encourage the particles to remain bound together. Such coating processes are often conducted under more abrasive conditions that discourage agglomeration, and usually involve the PCS absorbing an aqueous or non-aqueous solution or slurry of the coating agent, followed by drying in similar apparatus to the above dryers, or by contact with a substance that melts or softens, adheres to the PCS surface and is thereafter cooled. A very large number of suitable coating agents is known already. The inorganic agents include treatment with one ore more agents selected from alkali metal carbonate and/or sulphates, boric acid and/or alkali metal borates, alkali metal phosphates, alkali metal silicates, or polysilisic acids. A particularly desirable coating is based on the use of mother liquor, preferably containing additional coating agent, such as selected from the list of inorganic coating agents given above, or after prior concentration. Use of mother liquor in this manner in many instances reduces the amount of surplus mother liquor that would otherwise need to be discharged to waste or otherwise treated.

A coating with or containing an alkali metal chloride can also be contemplated, especially where the PCS is likely to be stored or employed in a dry atmosphere. It will be recognised that at least a fraction of the alkali metal salts can often be replaced by a magnesium salt, at the discretion of the user. Amongst organic coating agents can be contemplated polycarboxylates, hydroxycarboxylates, polyalkyleneaminocarboxylates and polyalkylenephosphonates, many of which have been classified as chelating agents, employable as chelating builders in detergent compositions. Examples include sodium citrate, sodium tartrate, sodium gluconate, EDTA, DTPA, and ethylenediamine tetramethylene phosphonate. Mixtures of the various inorganic and organic coating agents can be employed.

The PCS produced by a process according to the present invention, either as such or when subjected to subsequent treatments such as coating, can be employed for any of the uses hitherto proposed or adopted for particulate PCS. The products are particularly suitable for incorporation in particulate washing compositions, such as those summarised hereinbelow, for example in an amount up to about 30% w/w and often from 2 to 20% w/w, w/w herein indicating by weight based on the composition.

The washing composition can contain the other constituents that have been proposed or adopted. Such washing compositions are often targeted towards fabric washing, dishwashing or general purpose hard-surface cleansing. The other main constituents in such compositions comprise surfactants, often chosen in an amount of from 3 to 40% w/w and in many instances from 5 to 25% w/w, builder, often chosen in an amount of from 1 to 60% w/w and in many instances from 5 to 40% w/w, and adjuvants which often total no more than 20% w/w. The adjuvant often includes one or more germicides, soil anti redeposition agents, optical brighteners, antifoaming agents, colorants and perfumes, in up to a small amount for each, which is often less than 2% w/w. A further important adjuvant comprises a bleach activator, which can be present in an amount of usually not more than about 5% w/w, often 1 to 3% w/w and are in many instances O-acyl or N-acyl compounds which react with PCS to generate a peracid or similar peroxygen compound in alkaline solution or transition metal complexes, often of manganese, iron or cobalt. Some compositions can include a fabric softener, often in an amount of up to about 10% w/w, which is often a cationic surfactant deployed on a clay support. A further constituent of standard compositions, a bulking agent or processing aid, usually sodium sulphate or sodium chloride, can also be present, often in an amount of 0 up to about 70% w/w.

Suitable surfactants include soaps and synthetic surfactants which are often either anionic such as alkyl benzene sulphonates, olefin sulphonates, linear alkyl sulphonates, alcohol sulphates and other sulphated materials such as sulphated glycerides, ethers, sulphosuccinates or phosphate esters, and fluoralkylsulphonates or nonionic such as alcohol ethoxylates, alkylphenol ethoxylates polyethylene oxide/polypropylene block copolymers, and condensates of fatty acids or amides with aliphatic polyols such as sorbitol. The weight ratio of anionic to nonionic surfactants is often in the range of 5:1 to 1:2. Other classes of surfactant which can be present but usually to a lesser extent, include amphoteric, zwitterionic and cationic surfactants. Suitable cationics are often quaternary ammonium, phosphonium or sulphonium compounds.

Builders which can be employed in the washing composition are often chosen from two categories, inorganic builders and complexing organic builders. Inorganic builders include alkali metal condensed phosphates, and particularly tetrapyrophosphate, tripolyphosphate and metaphosphates, alkali metal borates, alkali metal carbonates and siliceous builders including alkali metal silicates, layered silicates such as products available under the trade designation SKS6, clays such as bentonite and especially zeolites such as zeolites A, X and Y and MAP zeolites. The PCS produced by the invention processes herein that are free from halide-salting out agent are particularly suitable for employment in conjunction with the most aggressive builders towards PCS, namely the zeolites.

The complexing organic builders often are selected from alkali metal polycarboxylates or polyaminocarboxylates or polyalkylenephosphonates. Examples include citrate, carboxylated starch derivatives; nitrilotrisodium triacetate, EDTA; EDTMP and DTPMP.

The alkali metal builder is frequently a sodium salt.

Where the sodium percarbonate and builder and/or diluent and/or bleach activator are formulated into dry belach compositions, the sodium percarbonate often constitutes from 10 to 90% w/w and the other constituents the remainder. The builder and diluent are each often selected in the range of from 10 to 80% w/w and the activator is often selected from 0 to 10% w/w. The builder and/or diluent and/or activator can be selected from the lists of materials described hereinbefore for washing compositions.

Having described the invention in general terms, specific embodiments thereof are described in greater detail by way of example only.

Plant suitable for the continuous operation of the invention process are described herein with reference to FIGS. 1 and 2.

FIG. 1 is a schematic representation of plant using a agitated reaction vessel and FIG. 2 is a schematic representation of a plant using a crystalliser/classifier.

In FIG. 1, a stirred cylindrical dissolution tank 1 has an inlet line 2 for sodium carbonate, inlet line 3 for process additives, a pumped return line 4 for recycled mother liquor and a pumped outlet line 5 for mother liquor containing additional sodium carbonate. The outlet line 5 feeds into a cooled and stirred cylindrical reaction vessel 6, into which is also fed a hydrogen peroxide feed line 7 and a feed line for particulate sodium carbonate 8. The reaction vessel 6 has a valved outlet line 9 feeding into into a centrifuge 10. The centrifuge 10 has a damp cake outlet line 11 leading to a drier 12 and a liquor outlet line 13 leading in a cooled storage tank 14 having an overflow line 15 and as outlet the pumped return line 4.

In operation, particulate sodium carbonate is fed continuously into dissolution tank 1 through line 2 at a rate of 10 kg/hr and additives were fed through line 3, namely disodium dihydrogen phosphate (10% w/w, 1.09 l/hr polyacrylate (30% w/w, 35 g/hr) and sodium silicate ($Na_2O:SiO_2$ of 1:2, 17.5% w/w, 0.5 l/hr. The tank 1 is maintained at 25 C. Liquor containing sodium percarbonate at 230 g/kg and hydrogen peroxide at 28 g/kg is continuously withdrawn through line 5 at a rate of 100 l/hour and pumped into the reaction vessel 6, that is maintained at 17 C. The reaction vessel 6 is fed with hydrogen peroxide (60% w/w) containing hydroxyethylidene diphosphonic acid (1.55 g/l as 60% actives) at a rate of 13 l/hr and a second feed of sodium carbonate through line 8 at a rate of 7 kg/hr. In the vessel 6, sodium percarbonate is formed by reaction between the reactants and a particulate suspension is created. Particulate suspension is withdrawn though outlet line 8 into the centrifuge 10 from which damp cake is obtained at a rate of 23 kg/hr and sent to drier 14, and mother liquor is recovered through line 15 at 102 l/hr. The mother liquor is recycled to a storage tank 16 that is maintained at 13 C. Overflow mother liquor is removed from the circuit via line 15 to maintain a constant mass balance, and mother liquor containing sodium carbonate at 150 g/l and hydrogen peroxide at 50 g/l is recycled through line 4 to the dissolution tank 1.

In FIG. 2, there is shown a crystalliser comprising an agitated vertical cylindrical crystalliser 20 sitting above and communicating directly with an axially positioned agitated classifier 21. The crystalliser 20 is divided into a calm zone 22 and an agitated zone 23 by a horizontal mesh plate 24, and is equipped with a hollow paddle agitator 25 connected to hydrogen peroxide in-feed line 26 and with a cooling coil 27. The crystalliser is further provided with an inlet line for sodium carbonate solution 28 extending into agitated zone 23, and a pumped outlet line 29 for mother liquor located in the calm zone 22. Line 29 is divided into two lines 30 and 31, line 30 constituting an inlet line for mother liquor to be pumped upwardly into the classifier 21, and a line 31 leading to dissolution tank 32. The classifier 21 is provided with an outflow 33 for sodium percarbonate suspension which leads to centrifuge 34 which has an outlet 35 for damp cake leading to drier 36 and aqueous outlet 37 feeding into a holding tank 38, equipped with a cooling coil 39, an overflow line 40 and a pumped fluid return line 41 to the dissolution tank 32.

Agitated dissolution tank 32 is also provided with a feed line for sodium carbonate 42, and a feed line for additives 43.

In operation, the crystalliser 20 and classifier 21 are filled with an aqueous solution of sodium carbonate. An aqueous solution of sodium carbonate in mother liquor is obtained by pumping mother liquor through lines 31 and 41 into dissolution tank 33 at a rate of 218 l/hr, sodium carbonate through line 42 at a rate of 31.4 kg/hr and additives through line 43. The additives comprise sodium dihydrogen phosphate (10% w/w, 2.3 l/hr) polyacrylate (30% w/w, 370 g/hr) and sodium silicate ($Na_2O:SiO_2$ of 1:2, 17.5% w/w, 2.4 l/hr. The dissolution tank 32 is maintained at 35 C. The resultant solution is pumped through outlet line 28 at a rate of 253 l/hr into the agitated zone 23 of crystalliser 20. Hydrogen peroxide (40% w/w) containing hydroxyethylidenediphosphonic acid (1.33 g/l as 60% actives) is pumped through inlet line 26 and the hollow agitator 25 into the agitated zone 23. The sodium carbonate and hydrogen peroxide react in the crystalliser which is held at 18 C., forming an agitated suspension of crystalline sodium percarbonate, from which particulates descend into the classifier 21. The mesh plate 24 provides a calm zone 22 above the agitated zone 23 from which mother liquor withdrawn therefrom is substantially free from suspended particulates.

Within the classifier, the larger particles within the suspension tend to move downwards under gravity and in contrary motion to an upwelling of recycled mother liquor that is withdrawn from the calm zone 22 via outlet line 29 and fed upwardly at a rate of 273 l/hr from inlet lines 30. The smaller particles are more easily swept upwards by the recycled liquor so that there is a tendency to produce a narrower particle size distribution.

Sodium percarbonate suspension withdrawn through outlet 33 is fed into centrifuge 34 at a rate of 106.5 kg/hr where it is separated into a damp cake comprising 42.5 kg/hr that is fed to drier 36 and a mother liquor that is fed via line 37 to cooled storage tank 38 at a rate of 64 kg/hr. Mother liquor is then recycled via return line 41 to the dissolution tank 21 at a rate of 26.5 kg/hr.

EXAMPLE 1

In this Example, the plant of FIG. 1 was employed for the continuous production of PCS without addition of any salting out agent. In each cycle 60% of the soda ash is added via the dissolution tank at 25 C. to generate a solution at 87% of the saturated solution concentration, and 40% introduced by direct introduction of solids into the reaction vessel. The peroxide content of mother liquor exiting the dissolution tank was 30 g/l. The mole ratio of sodium carbonate to hydrogen peroxide in the crystalliser was maintained in the range of 1—1.1:1. The sodium percarbonate after drying had a 7 day aged heat emission of 1 $\mu$W/g in 16 hours, a mean particle size of 680 span 1.0 when measured by a laser granulometer by formula $(D_{90}-D_{10})/D_{50}$ where D is the diameter in microns. The product had a moisture pick-up rate of 14 g/kg .a bulk density of 990 g/kg and an avox of 14.7%

EXAMPLE 2

In this Example, the plant of FIG. 2 was employed in a continuous process for the production of PCS without any addition of salting out agent. The dissolution tank was operated at 45 C., and soda ash was dissolved in recycled mother liquor to obtain a concentration of 76% of the saturated solution. The mother liquor leaving the dissolution tank had a content of 8 g/l hydrogen peroxide. The mole ratio of sodium carbonate to hydrogen peroxide in the crystalliser was maintained in the range of 1–1.1:1.

The resultant product had a mean particle size of 650 microns (span of 0.9), 7 day aged emission of 2 $\mu$W/g a moisture pick-up of 1.5 g/kg and an avox of 14.9%. From a comparison with Example 1, it can be seen that the process lost more hydrogen peroxide during the recycle in Example 2, and the product retained the excellent heat emission and moisture pick-up properties of Example 1.

EXAMPLES 3 to 5

In these Examples, which were conducted in plant according to FIG. 1, the process was conducted by 100% of the soda ash being introduced directly into the reaction vessel. The mole ratio of hydrogen peroxide to sodium carbonate in the reaction vessel, the temperature in the dissolution tank and the product characteristics are summarised below in Table 1.

TABLE 1

| Example No | 3 | 4 | 5 |
|---|---|---|---|
| Process Characteristic | | | |
| Dissolution Tank ° C. | 30 | 32 | 31 |
| H$_2$O$_2$ in dissolution tank g/l | 30 | 28 | 23 |
| Mole ratio in vessel | 0.8 | 0.85 | 1.0 |
| Product Characteristic | | | |
| 7 day aged LKB - $\mu$W/g | <3 | 1.8 | <3 |
| mean particle size $\mu$ | 680 | 770 | 1000 |
| span | 1.1 | 1.2 | 1.0 |
| Bulk density g/kg | 930 | 920 | 895 |
| Avox % | 15.0 | 14.8 | 14.5 |

From Table 1, it can be seen that it is possible to obtain a product which simultaneously has a low heat emission (LKB) and a high avox and that the correlation is observable that the mean particle size tended to increase as the mole ratio of H$_2$O$_2$ to soda ash increased, demonstrating that for at least some purposes an optimum mole ratio is in the range of about 0.8 to about 0.85:1.

EXAMPLES 6 to 8

In these Examples, the plant of FIG. 1 was employed in a process operated without any salting out agent being employed, but varying the proportion of soda ash that was introduced into the process via the dissolution tank and via direct introduction (wetted) into the reaction vessel.

Certain important process and product characteristics are summarised in Table 2 below.

TABLE 2

| Example No | 6 | 7 | 8 |
|---|---|---|---|
| Process Characteristic | | | |
| proportion of soda ash added in dissolution tank | 100 | 70 | 50 |
| Dissolution Tank ° C. | 45 | 30 | 27 |
| % of saturation | 82 | 75 | 85 |
| H$_2$O$_2$ in dissolution tank g/l | 8 | 25 | 30 |
| Mole ratio in vessel | 1-1.1:1 | 1-1.1:1 | 1-1.1:1 |
| Product Characteristics | | | |
| 7 day aged LKB - $\mu$W/g | 2.3 | 1.0 | 2.4 |
| mean particle size $\mu$ | 950 | 840 | 700 |
| span | 0.9 | 1.0 | 1.2 |
| bulk density | 900 | 920 | 860 |
| Avox % | 15.0 | 15.0 | 14.4 |

From Table 2, it can be seen that the effect of lowering the temperature in the dissolution tank is to improve the recovery of hydrogen peroxide in the cycle. A further detectable trend is that the mean particle size of the product can be controlled by varying the proportion of soda ash introduced directly into the reaction vessel. All the products displayed an excellent heat emission (LKB). The moisture pick-up of the product of Example 6 was measured and found to be 9.4 g/kg, confirming that the process produces a product with low moisture pick-up.

EXAMPLE 9

In this Example, the plant of FIG. 1 was employed for a continuous process operated without any salting out agent. The relevant process and product information is summarised below.

TABLE 3

| Example No | 9 |
|---|---|
| Process Characteristic | |
| proportion of soda ash added in dissolution tank | 100 |
| Dissolution Tank ° C. | 30 |
| % of saturation | 75 |
| H$_2$O$_2$ in dissolution tank g/l | 28 |
| Mole ratio in vessel | 1-1.1:1 |
| Product Characteristic | |
| 7 day aged LKB - $\mu$W/g | 2.0 |
| mean particle size $\mu$ | 870 |
| span | 1.0 |
| bulk density | 830 |
| Avox % | 14.9 |

From Table 3, it can be seen that a product having excellent heat emission (LKB) can be obtained. The mother liquor leaving the dissolution tank still retained a high concentration of H$_2$O$_2$.

EXAMPLE 10

In this Example, the plant of FIG. 2 was employed in a continuous process free from salting out agent. The relevant process and product information is summarised below.

TABLE 4

| Example No | 10 |
| --- | --- |
| Process Characteristic | |
| proportion of soda ash added in dissolution tank | 100 |
| Dissolution Tank ° C. | 27 |
| % of saturation | 85 |
| $H_2O_2$ in dissolution tank g/l | 30 |
| Mole ratio in vessel | 1-1.1:1 |
| Product Characteristics | |
| 7 day aged LKB - $\mu W/g$ | <1.0 |
| mean particle size $\mu$ | 670 |
| span | 0.6 |
| bulk density | 900 |
| Avox % | 15.0 |

It can be seen that the product obtained in this Example had a very low heat emission and a tight particle span.

EXAMPLES 11 to 13

In these Examples, washing compositions are obtained by dry blending sodium percarbonate obtained by operation of a process similar to Example 5 and having the properties of heat emission of <3 $\mu W/g$, water pick-up of 10 g/1000 g, mps (mean particle size) of 770 $\mu$ (span 1.0) bulk density 920 g/1000 g, into a pre-formed mixture of the remaining constituents. The constituents and their respective proportions are summarised in Table 5 below.

In Table 5, ABS indicates sodium alkyl benzene sulphonate, AEO alcohol ethoxylate, other surfactant includes a soap, and/or a cationic surfactant, the bleach activator is tetra acetyl ethylene diamine, or sodium nonanoyl oxybenzenesulphonate and the detergent adjuvants include one or more polycarboxylate or polyphosphonate complexing builder, one or more cellulose derivatives, PVP and/or maleic anhydride copolymers acting as soil anti redeposition agents, an aminostilbene optical brightener, colorant and perfume and optionally an amylase, protease lipase esterase or cellulase enzyme.

TABLE 5

| | Amount % w/w | | |
| --- | --- | --- | --- |
| Example No | 11 | 12 | 13 |
| anionic surfactant - ABS | 9 | 15 | 7 |
| nonionic surfactant - AEO | | 3 | 3 |
| other surfactant | 9 | | 3 |
| Zeolite 4A | 28 | 20 | |
| Na tripolyphosphate | | | 37 |
| Na carbonate | 10 | 14 | |
| Sodium Percarbonate | 15 | 20 | 15 |
| Bleach Activator | | 3 | |
| Sodium Sulphate | 6 | 18 | 17 |
| Detergent adjuvants | 9 | 3 | 8 |

Similar compositions are obtainable by varying the amounts of constituents listed above, within the ranges known within the detergent industry to remain effective, and by replacing all or part of individual constituents, such as by replacing all or a fraction of the ABS with an alkyl sulphate, alcohol sulphate, sulphate glyceride or succinate or phosphate esters, and/or by replacing the AEO at least in part by an ethoxylated alkyl phenol, a PEO/PPO copolymer or fatty acid/amide polyols and/or by replacing zeolite 4A with SKS6, or MAP zeolites and/or partly with sodium silicate, and/or by replacing at least partly tripolyphosphate with sodium tetraphosphate and/or by replacing the diluent sodium sulphate with sodium chloride.

The sodium percarbonate can be varied by employing the products of the other Examples or the like which intrinsically meet the requirement of low heat emission and acceptable mean particle size. The PCS can be further varied by employing such products which are intrinsically acceptable as the core for a coating, for example in an amount of from 2 to 5% w/w (particularly 3%) of sodium sulphate/carbonate, sodium borate/silicate, or coating agents contacted in acid form such as a mixture of boric acid with neutral salts such as sodium sulphate and/or chloride and optionally a carboxylic acid and/or hydroxycarboxylic acid capable of forming a complex with an oxy-boron compound, or especially using mother liquor containing added sodium sulphate to a mole ratio of $Na_2CO_3:Na_2SO_4$ of from 1:2 to 2:1.

The compositions will demonstrate varied rates of decomposition of the sodium percarbonate, but all will enjoy the benefit of employing the readily bulk storable PCS and the stability offered by a large particle size in comparison with the use of PCS that does not meet either or both of the twin features of low heat emission and large particle size.

What is claimed is:

1. A continuous process for manufacturing sodium percarbonate by reacting hydrogen peroxide and sodium carbonate in an agitated reaction vessel containing a mother liquor at a temperature from 10 to 25° C. with formation of sodium percarbonate which precipitates out of solution, the precipitated sodium percarbonate being separated from the mother liquor and recovered as product the process comprising:

recycling a fraction of the mother liquor separated from the sodium percarbonate and containing residual hydrogen peroxide, and continuously feeding said fraction and particulate sodium carbonate into a dissolution tank maintained within a temperature range of from 20 to 50° C., wherein the dissolution tank has a sodium carbonate concentration which does not exceed 95% of a saturated solution and rate of hydrogen peroxide decomposition is retarded;

continuously withdrawing a solution from the dissolution tank and introducing said solution into the reaction vessel containing an aqueous suspension of sodium percarbonate particles in the mother liquor;

continuously introducing a concentrated hydrogen peroxide solution into the reaction vessel; and continuously introducing particulate sodium carbonate into the dissolution tank or directly into the reaction vessel or introducing a portion of the sodium carbonate into the dissolution tank and a portion into the reaction vessel, quantities of hydrogen peroxide and sodium carbonate introduced being such that, in the reaction vessel, a mole ratio calculated as $H_2O_2$ to $Na_2CO_3$ is maintained within a range of more than 0.7:1 and less than 1.3:1, the mother liquor being free from salting out agent, and respective flow rates of hydrogen peroxide and sodium carbonate introduced and product withdrawn from the reaction vessel being such that a concentration of sodium carbonate in the reaction vessel is maintained within a range of 100 to 160 g/kg and concentration of hydrogen peroxide in the reaction vessel is maintained in the range of 25 to 65 g/kg.

2. A process according to claim 1 wherein the concentration of sodium carbonate in the dissolution tank is selected within the range of 60 to 90% by weight of the saturation concentration.

3. A process according to claim 1 wherein the temperature of the dissolution tank is selected in the range of 15 to 35° C.

4. A process according to claim 1 wherein the mole ratio of hydrogen peroxide and sodium carbonate in the reaction vessel is selected in the range of 0.8 to 1.2:1.

5. A process according to claim 1 wherein the concentration of sodium carbonate in the reaction vessel is selected in the range of 130 to 150 g/kg.

6. A process according to claim 1 wherein the concentration of hydrogen peroxide in the reaction vessel is selected in the range of 35 to 60 g/kg.

7. A process according to claim 1 wherein the mother liquor contains at least one stabiliser for hydrogen peroxide in aqueous alkaline solution.

8. A process according to claim 7 further comprising introducing at least one hydrogen peroxide stabiliser into the dissolution tank.

9. A process according to claim 7 wherein the stabiliser is selected from at least one of sodium silicate, polycarboxylate complexing agents and polyphosphonate complexing agents.

10. A process according to claim 1 wherein the reaction is conducted in the presence of a crystal habit modifier.

11. A process according to claim 10 wherein the crystal habit modifier is selected from at least one of alkali metal and ammonium salts, homo and copolymers of acrylic acid and methacrylic acid, and alkali metal phosphates.

12. A process according to claim 10 wherein the crystal habit modifier comprises one of a polyacrylate and a mixture of a polyacrylate and a pyrophosphate.

13. A process according to claim 1 wherein the mother liquor is withdrawn from a calm zone in the reaction vessel.

14. A process according to claim 1 wherein all the sodium carbonate is introduced directly into the reaction vessel.

15. A process according to claim 1 wherein at least 10% of the sodium carbonate is introduced directly into the reaction vessel.

16. A process according to claim 1 wherein particulate sodium carbonate is introduced directly into the reaction vessel by introducing the sodium carbonate into a stream or recycled mother liquor or liquor withdrawn from the dissolution tank that is being fed into the reaction vessel.

17. A process according to claim 1 wherein the reaction vessel forms an integral part of a crystalliser classifier.

18. A process according to claim 1 wherein 35 to 90% of the sodium carbonate is introduced via dissolution in mother liquor and a remainder thereof is introduced in solid form.

19. A process according to claim 1 further comprising coating the sodium percarbonate with at least one of an inorganic coating agent and an organic coating agent.

20. A process according to claim 19 wherein the coating step is carried out by contacting the sodium percarbonate with the mother liquor in an amount sufficient to coat said sodium percarbonate with 1 to 5% coating agent and thereafter drying the resultant mixture.

21. Dry particulate sodium percarbonate produced by crystallization from a bulk solution containing hydrogen peroxide and sodium carbonate, and produced in a process free from any salting out agent, said dry particulate sodium percarbonate having:
a) a mean particle size of at least 500 µm to 1200 µm;
b) a 7 day aged heat emission in 16 hours at 40° C. of below 3 µW/g;
c) a moisture pick-up over 24 hours storage at 80% relative humidity and at 32° C. of not more than 30 g/kg;
d) an apparent bulk density of 800 to 1000 g/kg;
e) an Avox of at least 14.5%.

22. Sodium percarbonate as claimed in claim 21 comprising at least one phosphonate stabiliser and at least one crystal habit modifier selected from sodium silicate and a polyacrylate in a total amount of from 1 to 8 g/kg, and having an Avox of at least 14.8%.

23. Sodium percarbonate as claimed in claim 21 having an apparent bulk density of 850 to 1000 g/kg.

24. Sodium percarbonate as claimed in claim 21 having a moisture pick-up over 24 hours storage at 80% relative humidity and at 32° C. of not more than 15 g/kg.

25. Particulate sodium percarbonate according to claim 21 having a mean particle size of 600 to 650 microns.

26. Particulate sodium percarbonate according to claim 25 produced using a crystalliser-classifier.

27. Particulate sodium percarbonate according to claim 21 having a mean particle size of about 750 microns.

28. Particulate sodium percarbonate according to claim 21 produced by a continuous process wherein hydrogen peroxide and sodium carbonate are reacted in an agitated reaction vessel containing a mother liquor at a temperature from 10 to 25° C. with formation of sodium percarbonate which precipitates out of solution, the precipitated sodium percarbonate being separated from the mother liquor and recovered as product, the process comprising:
recycling a fraction of the mother liquor separated from the sodium percarbonate and containing residual hydrogen peroxide, and continuously feeding said fraction and particulate sodium carbonate into a dissolution tank maintained within a temperature range of from 20 to 50° C., wherein the dissolution tank has a sodium carbonate concentration which does not exceed 95% of a saturated solution and rate of hydrogen peroxide decomposition is retarded;
continuously withdrawing a solution from the dissolution tank and introducing said solution into the reaction vessel containing an aqueous suspension of sodium percarbonate particles in the mother liquor;
continuously introducing a concentrated hydrogen peroxide solution into the reaction vessel; and
continuously introducing particulate sodium carbonate into the dissolution tank or directly into the reaction vessel or introducing a portion of the sodium carbonate into the dissolution tank and a portion into the reaction vessel, quantities of hydrogen peroxide and sodium carbonate introduced being such that, in the reaction vessel, a mole ratio calculated as $H_2O_2$ to $Na_2CO_3$ is maintained within a range of more than 0.7:1 and less than 1.3:1, the mother liquor being free from salting out agent, and respective flow rates of hydrogen peroxide and sodium carbonate introduced and product withdrawn from the reaction vessel being such that a concentration of sodium carbonate in the reaction vessel is maintained within a range of 100 to 160 g/kg and concentration of hydrogen peroxide in the reaction vessel is maintained in the range of 25 to 65 g/kg.

29. Sodium percarbonate as claimed in claim 21 comprising a sodium percarbonate core material coated with one or more inorganic or organic agents.

30. Sodium percarbonate as claimed in claim 29 wherein the coating is provided by contacting the core material with a mother liquor in an amount sufficient to coat said core material with 1 to 10% coating agent and thereafter drying the resultant coated core material.

* * * * *